United States Patent
Popelier

[19]

[11] Patent Number: 5,887,544
[45] Date of Patent: Mar. 30, 1999

[54] FEED SAVING INSERT FOR ANIMAL FEED BUCKETS

[76] Inventor: Michael P. Popelier, P.O. Box 184, Okanogan, Wash. 98840

[21] Appl. No.: 979,404

[22] Filed: Nov. 26, 1997

[51] Int. Cl.[6] ...................................................... A01K 5/01
[52] U.S. Cl. ................................................ 119/61; 119/65
[58] Field of Search ............................... 119/61, 65, 66, 119/67, 68, 69, 53–5, 72, 73

[56] References Cited

U.S. PATENT DOCUMENTS

| D. 46,288 | 8/1914 | Moe ........................................ D30/133 |
| D. 133,862 | 9/1942 | Kinkel ..................................... D30/130 |
| D. 296,020 | 5/1988 | McCarroll ............................... D30/130 |
| D. 300,964 | 5/1989 | Sutton et al. ........................... D30/133 |
| 387,821 | 8/1888 | Smith ....................................... 119/66 |
| 960,250 | 6/1910 | Beenken . |
| 1,064,745 | 6/1913 | Klenert ..................................... 119/66 |
| 2,590,266 | 3/1952 | Nelson ..................................... 119/73 |
| 4,708,091 | 11/1987 | Schafer ..................................... 119/73 |
| 5,174,245 | 12/1992 | Bishop ..................................... 119/73 |
| 5,377,621 | 1/1995 | Camm ....................................... 119/61 |

Primary Examiner—Jack W. Lavinder
Assistant Examiner—Yvonne R. Abbott
Attorney, Agent, or Firm—Wells, St. John, Roberts, Gregory & Matkin P.S.

[57] ABSTRACT

A feed saving insert is described that is positionable on the surface of feed within a feed bucket. The insert includes a sheet formed into a disk that is sized to be loosely received through the bucket top opening and to rest against feed within the bucket. Access apertures are formed through the disk and are uniformly spaced about the disk to permit limited access to feed under the disk. The disk and access apertures are sized such that access to the feed within the bucket is limited and so the disk will float on the feed within the bucket and will change in elevation within the bucket in response to removal of feed during feeding. A guide shaft is provided, projecting downwardly from the disk and through an opening in the bucket bottom to hold the disk substantially parallel to the bucket bottom and guide the disk in its downward movement responsive to removal of feed from the bucket.

16 Claims, 4 Drawing Sheets

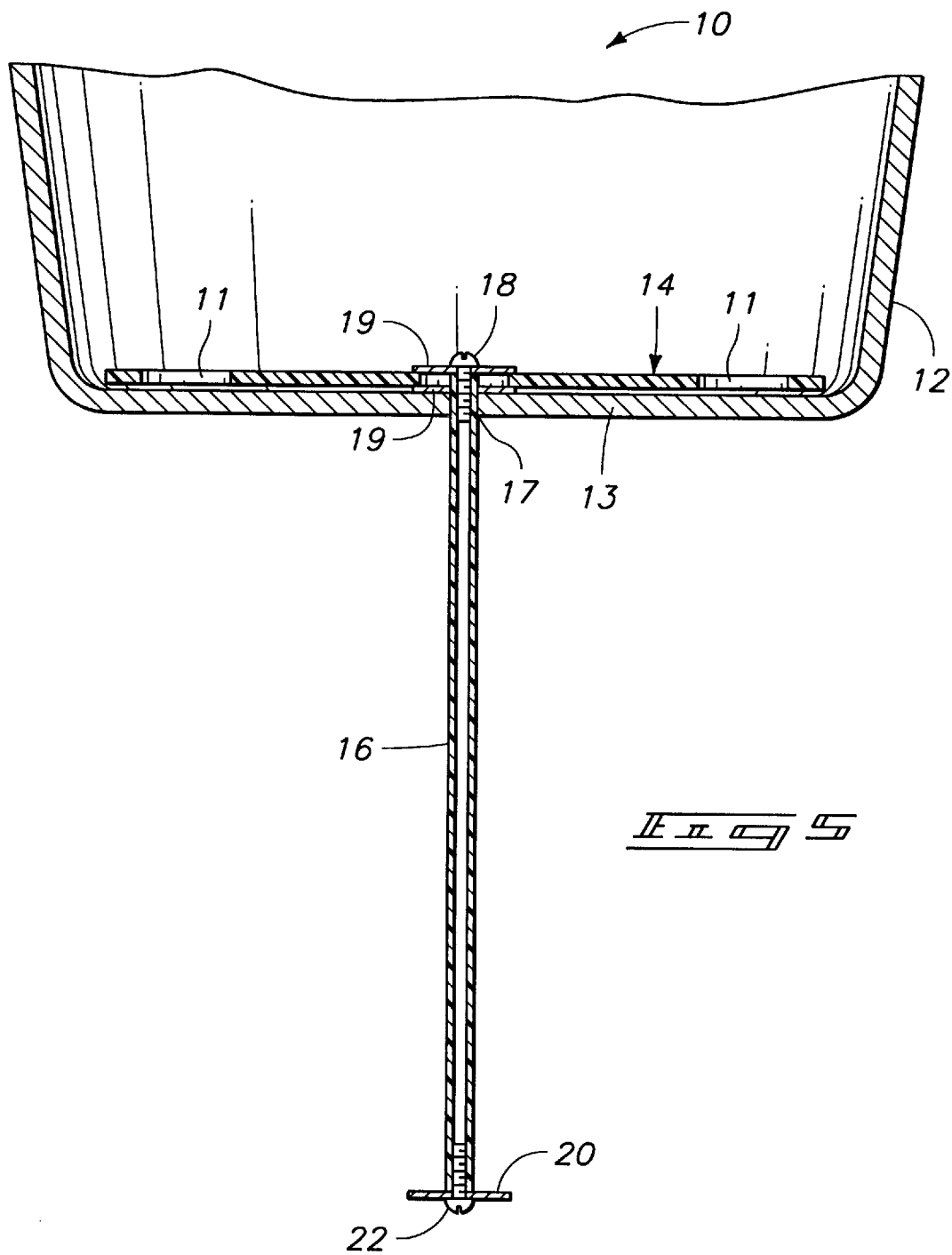

FEED SAVING INSERT FOR ANIMAL FEED BUCKETS

TECHNICAL FIELD

The present invention relates to restricting feeding access within a feed bucket.

BACKGROUND OF THE INVENTION

Some animals, especially horses are notorious for wasting feed such as grain which is fed from conventional buckets. Horses in training for special events are fed with various grains and other granular or powdered nutrients during conditioning, and it is typical that the feed is portioned carefully according to the training being completed. The typical manner in which feed is presented involves selecting an appropriate bucket, placing a measured amount of feed in the bucket, then hanging the bucket in the horse's stall, paddock, or corral in which the horse is kept.

A typical full grown horse will feed by gorging its mouth with feed in the bucket, then raise its head from the confines of the bucket before chewing. A grown horse will usually take about two cups of feed in its mouth, then in the process of chewing, lose about 35% of the feed. This causes wastage of feed, and inability for the trainer to accurately meter the amount of feed actually ingested by the horse. Of course different horses, having different physical and psychological characteristics will feed differently, and the trainer may not rely on the otherwise seemingly simple solution of overfeeding the horse by approximately 35% to accommodate for the loss during chewing.

The feed loss typically occurs as spillage into the stall, paddock, or corral, where the lost feed cannot be easily recovered by the animal. Yet the spilled feed will remain, often attracting unwanted rodents such as mice and rats.

It is also a fairly common practice to include measured amounts of medication, feed supplements, vitamins, or other treatment materials to feed for consumption by an animal. If the animal is likely to spill a considerable amount of feed, it is logical that a similar amount of an additive will be spilled as well. This causes a dosage problem, since it becomes difficult to determine whether the animal has actually ingested the desired amount of treatment materials.

It is desirable to avoid feed wastage, to economize on feed, to enable accuracy in dietary portioning, and to minimize attraction to rodents. The present invention, as will be understood below, fulfills this need.

BRIEF DESCRIPTION OF THE DRAWINGS

Preferred embodiments of the invention are described below with reference to the following accompanying drawings.

FIG. 5 is a sectional view of the insert with a portion of a feed bucket broken away.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
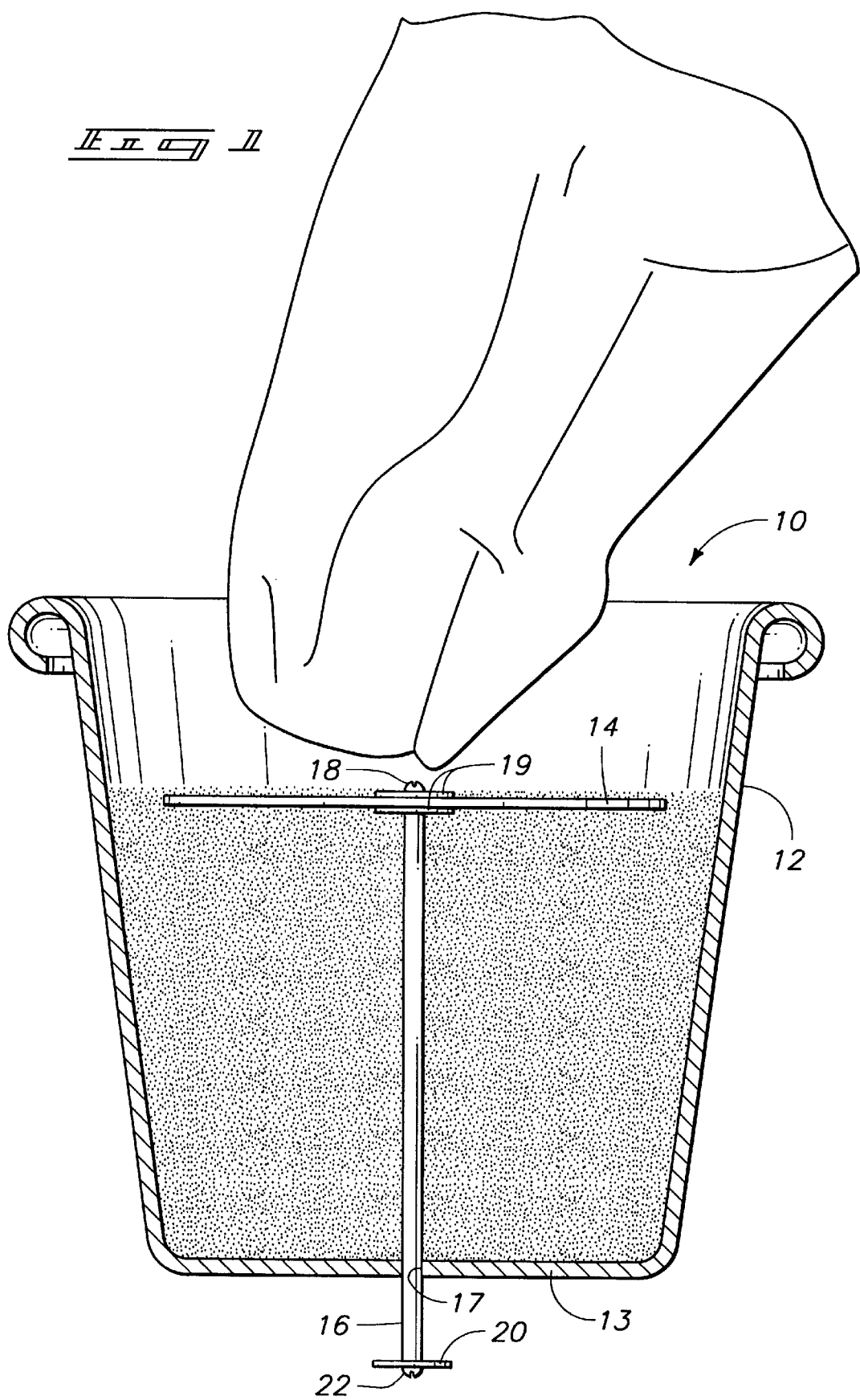
FIG. 1 is sectional view through a partially filled bucket with an exemplary insert including a guide shaft positioned therein and a fragmented showing of a feeding animal.

The present feed saving insert 10, in a preferred form, is comprised of a thin flat sheet of material formed as a disk 14 and sized to permit the insert to be loosely received within a feed bucket 12 on the top or near the top of an amount of feed within the bucket 12 (FIG. 1).

The overall outer dimensions of the insert 10 are such that the disk 14 will "float" within the feed bucket 12 and will remain substantially parallel with the bucket bottom 13 at any feed level within the bucket 12.

A number of apertures 11 are formed through the disk 14 to permit limited access to the feed below. With the disk in place in a feed bucket the amount of feed available at any given time to the feeding animal is controlled through the apertures not to exceed an amount considered an adequate "mouthful". As the animal feeds, successive "mouthfuls" will become available through the apertures until the full amount is consumed. The disk 14 will move downwardly within the bucket 12 as the feed level decreases during feeding.

The size and number of access apertures 11 in the disk 14 permit upward passage of feed which is drawn to the top surface of the disk, by action of the feeding animal. In a preferred configuration the amount of restriction (the surface through which feed is not allowed to pass) ranges between approximately 70% and 90% of the entire area within the perimeter of the insert. This leaves a range of approximately 10% and 30% of the insert surface open by reason of the spaced apertures 11.

Metered amounts of feed will thus be accessible through the apertures 11, not exceeding the "mouthful" amount to be taken into the animal's mouth and chewed without spillage. The relationship noted above may be made proportional to the feed bucket size, and selection of aperture size may be determined in accordance with the nature and propensities of the animal to be fed.

A substantially circular disk 14 is used for typical feed buckets which have a generally frusto-conical shape with circular top openings and circular closed bottoms. The shape of the disk is made to be similar to the bucket bottom 13 so the disk will "float" in the bucket 12 and not become wedged against the bucket walls during feeding. The disk 14 will also remain substantially parallel to the bucket bottom, due in part to the uniform spacing of the apertures about the disk surface. The feed will thus be available across the entire surface of the disk and the animal need not resort to pushing against one side to obtain feed, thereby eventually pushing the disk down one side of the bucket.

In the preferred forms of the present insert 10, the disk 14 is formed of clear plastic. Clear plastic is preferred to enable a feeding animal to easily see the surface of feed in the bucket 12. The disk shape may be formed by stamping or other convenient forming processes. In more specific preferred forms, a transparent polycarbonate plastic is used, having an approximate thickness of 0.0625 inches. Polycarbonate of this approximate thickness has been found to hold up well to adverse weather conditions, and to withstand rough treatment during aggressive feeding.

The following examples are given for inserts 10 used in standard 3, 4, and 5 gallon feed buckets. While these bucket sizes are substantially standard for feed buckets, it should be understood that the present insert could also be produced for use with other bucket sizes.

A typical 4 gallon feed bucket 12 has a top opening diameter of approximately 12.5 inches, a height of approximately 11 inches, and a closed bottom diameter of approximately 10 inches. Thus the present insert, when manufactured for use with a 4 gallon feed bucket 12, will have a disk diameter of approximately 10 inches.

The apertures 11 are uniformly spaced about the disk and are sized to open a selected percentage of the total area within the disk perimeter for feed access. Where a total access opening is to be approximately 30% of the disk area, 18 uniformly spaced apertures of approximately 1.25 inches diameter are advantageously used. This disk 14 functions well for metering feed to horses from a conventional 4 gallon feed bucket.

If a more aggressive animal is to be limited to a similar quantity of feed, a disk 14 having less open area may be selected. For example a 10 inch diameter disk having 18 uniformly spaced apertures, each having a diameter of approximately 0.75 inches will have approximately 90% of the total area within its perimeter occluded, and 10% of the area will be open for access to feed. An aggressive animal may obtain a similar amount of feed through the 90% occluded disk, as a docile animal may obtain from a 70% occluded disk.

Spillage using the above described insert 10 in such a 4 gallon bucket 12 was reduced by approximately 90% (compared to spillage of the same type of feed using the same 4 gallon bucket 12 without the present insert in place).

Different bucket sizes and shapes will dictate different disk sizes. However as noted above, the general relationship of restriction area to the overall area occupied by the insert 10 (including openings) will remain approximately the same (approximately 70% through 90% of the insert area being restricted or occluded by the plastic material, and approximately 10% to 30% being open by reason of the apertures 11).

In another example, a 5 gallon bucket 12 may make use of an 11 inch diameter insert 10 with 18 evenly spaced openings totaling approximately 30% of the area occupied within the disk perimeter. Thus the total area of an 11 inch diameter insert would be approximately 95 square inches, and the total area occupied by openings would be approximately 28.5 square inches (30% of the disk area). Thus, 18 equally spaced apertures, each having a diameter of approximately 1.4 inches will suffice for this application.

According to the preferred range of opening percentile (approximately 10% through 30%), a reduction in aperture diameter in an 11 inch diameter insert will correspondingly reduce the percentage of the total area open for feeding. Thus an 11 inch diameter disk having 18 equally spaced apertures, each having a diameter of approximately 0.8 inches will reduce the total opening area to approximately 10% of the area within the 11 inch diameter perimeter.

A typical 5 gallon feed bucket 12 will include a bottom diameter of approximately 11 inches; a 4 gallon feed bucket 12 will typically have a bottom diameter of 10 inches; and a 3 gallon feed bucket 12 will typically have a bottom diameter of 9 inches. It may be understood at this point that the bottom diameter of the bucket 12 substantially dictates the diameter of the insert 10, to enable the insert to descend (as feed is consumed) to the bucket bottom 13 (see FIG. 5). Thus an insert 10 having a maximum desirable diameter of 11 inches is used in a 5 gallon bucket with an 11 inch diameter base.

In another example, a 3 gallon bucket may best make use of a 9 inch diameter disk (the bucket bottom 13 being approximately 9 inches in diameter) with evenly spaced openings totaling approximately 30% of the total area occupied by the disk. In a preferred application, evenly spaced apertures, each having a diameter of approximately 1.2 inches may be formed in the insert such that approximately 30% of the disk area is open for access to feed.

In general, the preferred individual apertures 11 are circular, and fall within a diameter range of approximately 0.75 inches to approximately 1.4 inches diameter as a maximum approximate opening size. The number of apertures and the aperture diameters may vary within the approximate range, but the total area open for access should remain within approximately 10% to 30% of the overall disk area. Openings within the above size range are preferred for use with the disk size examples listed above, since the opening size must be sufficient to permit passage of feed but small enough to meter the amount of feed flow.

Openings in the above size range have been found to permit passage of feed through the openings in amounts that will prevent a horse from gorging its mouth and then spilling a part of the mouthful during chewing.

Figure 3:
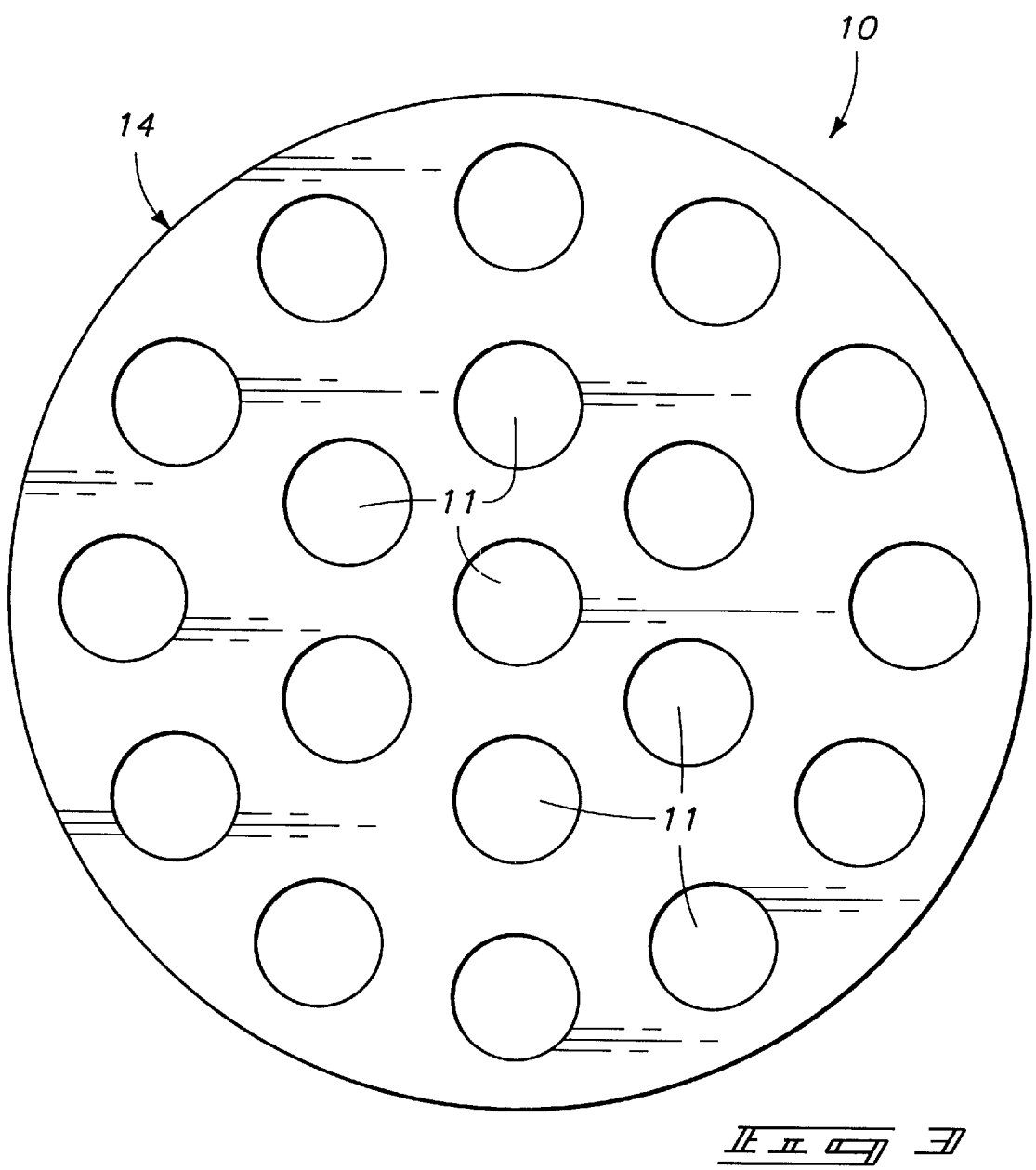
FIG. 3 is a top plan view without the guide shaft, the opposite bottom plan view being a mirror image thereof.

Spacing of the apertures 11 is uniform so the disk will descend uniformly and remain substantially parallel to the bottom 13 of the bucket. In the 10 inch diameter example, one aperture is situated in the center of the disk and the remaining apertures are spaced apart by equal distances. In a preferred arrangement, the apertures for a 10 inch diameter disk are spaced approximately 1.94 inches on center from adjacent apertures in a pattern as shown in FIG. 3. When in use, the insert is placed on top of feed within a full or partially full bucket. The insert will remain in that relative position, metering feed to the animal during feeding until the bucket is empty, at which time the insert will rest on the bucket bottom 13.

The openings, though preferably all similarly sized and equally spaced in a single insert, could be of slightly variant sizes in the same insert. But regardless whether the openings are of uniform or variant size, uniform spacing of the openings about the disk 14 is preferred to avoid the disk 14 becoming angularly disoriented in the bucket during feeding.

In a preferred form, the present insert includes a central guide shaft 16 that projects from the disk 14 and extends through a hole 17 formed in the bottom 13 of the associated feed bucket 12. The shaft 16 will slide in the hole 17 and serve to hold the disk 14 substantially parallel to the bucket bottom 13, regardless of the feed level in the bucket or the angular orientation of the bucket. This arrangement is particularly useful with very aggressive horses that are known to upturn a feed bucket. The guide shaft 16 is preferably formed of a smooth, low friction material such as relatively rigid nylon tubing, and is held in place on the disk 14 by a pair of washers 19 and a screw 18 (FIG. 5). The screw 18 is threadably received by the shaft and is used to clamp the disk between the washers 19 and against the upper end of the shaft.

The bottom end of the shaft 16 is advantageously provided with a motion stop, which in a preferred form is comprised of another washer 20. The washer 20 may be held in place at the bottom end of the shaft 16 by a second screw 22. The washer 20 is selected to be larger in diameter than the hole 17 formed in the feed bucket 12, to thereby prevent the insert from being removed from the bucket.

In use, the present insert 10 is installed in an appropriate feed bucket and the disk 14 is allowed to rest on the bucket bottom 13, with the guide shaft 16 projecting below the bucket bottom 13 (FIG. 5). Feed is then poured into the bucket to a desired level. The shaft 16 may next be manually pushed upward while shaking the insert. The disk will move up through the feed to a point where the disk is on top of or just below the feed surface.

Feeding can now begin and the insert will serve to limit the amount of feed for access by the animal in the manner described above.

It is to be understood that the preferred insert may be provided to the consumer alone, without a feed bucket, for placement in an existing feed bucket.

Alternatively, the insert may be provided in combination with a feed bucket. In this case, the feed bucket will be supplied with a preformed hole to slidably mount the guide shaft 16.

Figure 2:
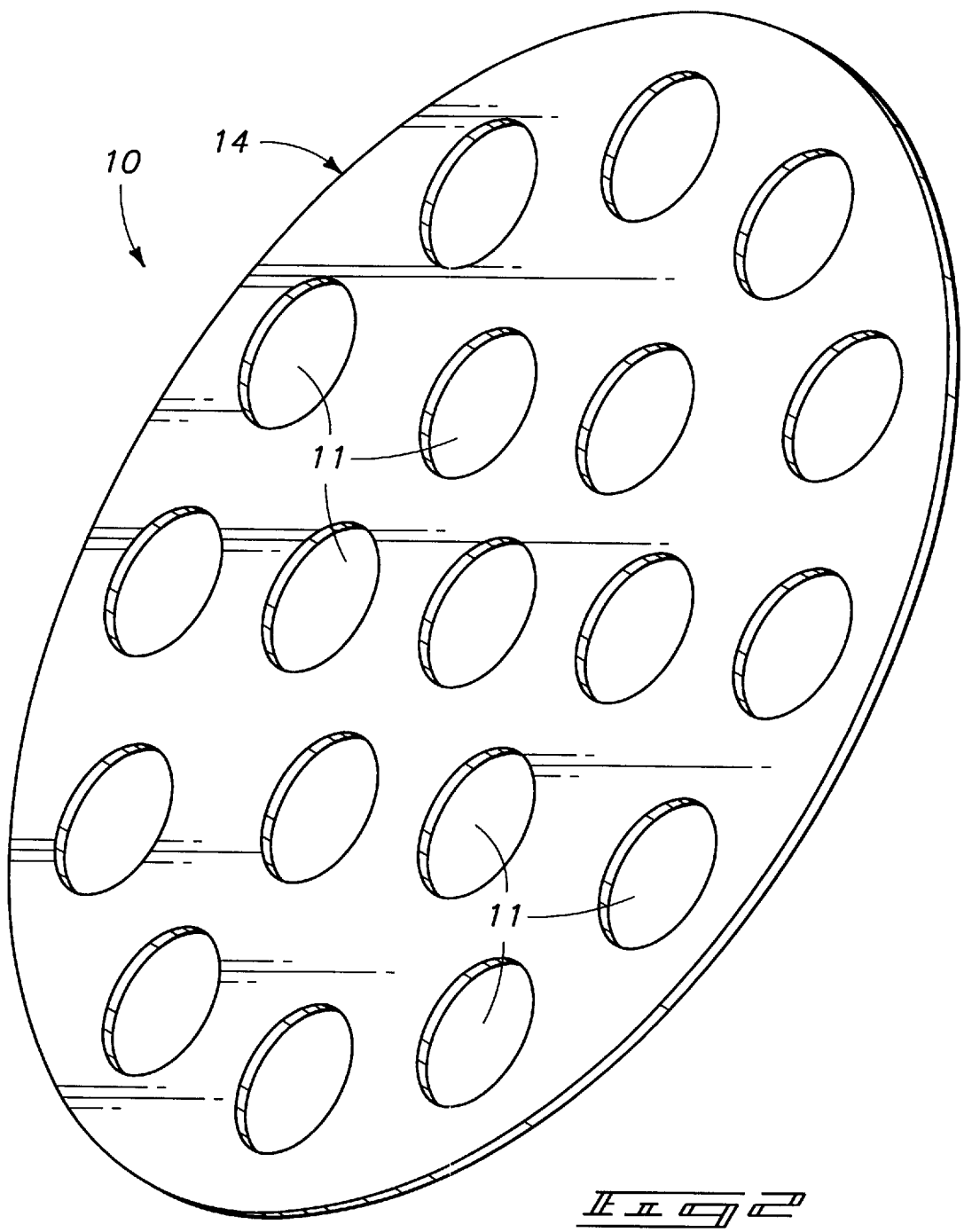
FIG. 2 is a perspective view of the present insert without the guide shaft attached thereto.
Figure 4:
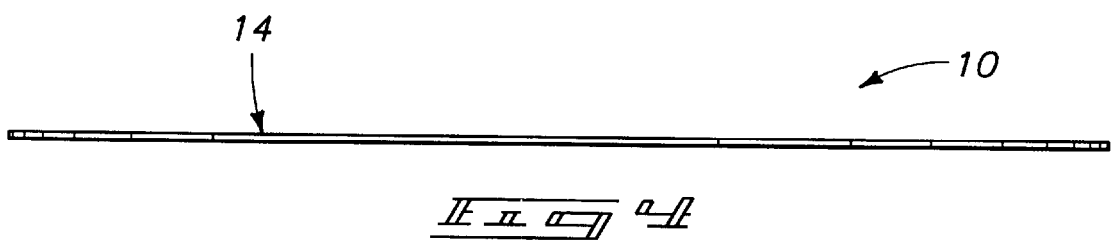
FIG. 4 is a side elevation view without the guide shaft.

As another alternative, it is possible to use just the disk without the guide shaft 16. To this end, the disk alone (as shown in FIGS. 2–4) may simply be placed on the top surface of feed in a feed bucket. The disk will stay in close proximity of the surface within the bucket, but will move downwardly as feed is consumed. This form of disk is useful particularly with animals that are not aggressive.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A feed saving insert positionable on the surface of feed within a feed bucket having a top opening, the insert comprising:

a sheet of material sized to permit the sheet to be loosely received through the feed bucket top opening and to rest against feed within the bucket;

access apertures formed through the sheet and spaced about the sheet a guide shaft on the sheet and projecting substantially perpendicularly from the sheet configured to be slidably received through a hole formed through the bucket bottom end;

said access apertures being sized such that access to the feed within the bucket is limited and wherein the sheet will float on the feed within the bucket and will change in elevation within the bucket in response to removal of feed during feeding.

2. A feed saving insert as claimed by claim 1 wherein the access apertures occupy approximately 10% to approximately 30% of the surface area occupied by the sheet.

3. A feed saving insert as claimed by claim 1 wherein the access apertures are evenly spaced apart across the sheet and occupy approximately 10% to approximately 30% of the area bounded by the perimeter of the sheet.

4. A feed saving insert as claimed by claim 1 wherein the apertures are circular and are evenly spaced, one from another across the sheet.

5. A feed saving insert as claimed by claim 1 wherein the access apertures are substantially circular and include diameters within a range of approximately 0.75 inches and 1.4 inches.

6. A feed saving insert as claimed by claim 1 wherein the sheet is formed of clear plastic.

7. A feed saving insert as claimed by claim 1 wherein the sheet is formed of plastic and includes a thickness dimension of approximately 0.0625 inches.

8. A feed saving feed insert and feed bucket, comprising:

a feed bucket having an open top end and a closed bottom end;

a sheet of material loosely received through the open top end of the feed bucket and movable elevationally therein toward the bucket bottom end; and access apertures formed through the sheet and spaced about the sheet to permit limited access to feed within the bucket between the sheet and the bucket bottom;

wherein the sheet will float on feed within the bucket and will change in elevation within the bucket in response to removal of feed during feeding.

9. A feed saving insert as claimed by claim 8 wherein the access apertures occupy approximately 10% to approximately 30% of the area bounded by the perimeter of the sheet.

10. A feed saving insert and feed bucket as claimed by claim 8 wherein the access apertures are evenly spaced about the sheet and occupy approximately 10% to approximately 30% of the area bounded by the perimeter of the sheet.

11. A feed saving insert and feed bucket as claimed by claim 8 wherein the access apertures are substantially circular and include diameters within a range of approximately 0.75 inches and 1.4 inches.

12. A feed saving insert and feed bucket as claimed by claim 8 wherein the sheet is shaped similarly to the closed bottom end of the bucket.

13. A feed saving insert and feed bucket as claimed by claim 8 wherein the sheet is formed of plastic and includes a thickness dimension of approximately 0.0625 inches.

14. A feed saving insert and feed bucket as claimed by claim 8 wherein the sheet is formed of transparent plastic.

15. A feed saving insert and feed bucket as claimed by claim 8 wherein the sheet is shaped similarly to the closed bottom end of the bucket.

16. A feed saving insert and feed bucket as claimed by claim 8 further comprising a guide shaft on the sheet and projecting substantially perpendicularly from the sheet configured to be slidably received through a hole formed through the bucket bottom end.

* * * * *